United States Patent
Muehlinghaus et al.

(10) Patent No.: US 9,254,463 B2
(45) Date of Patent: Feb. 9, 2016

(54) HOLLOW FIBER MEMBRANE MATS WITH FLUID IMPERMEABLE SEGMENTS AND RELATED METHODS

(75) Inventors: Christian Muehlinghaus, Schwelm (DE); Gareth Peter Taylor, Indian Trail, NC (US); James Clifton Delozier, Fort Mill, SC (US); Eric J. Penegar, Fort Mill, SC (US); Kwantai Cho, Charlotte, NC (US)

(73) Assignee: Membrana GmbH, Wuppertal (DE)

( * ) Notice: Subject to any disclaimer, the term of this patent is extended or adjusted under 35 U.S.C. 154(b) by 869 days.

(21) Appl. No.: 13/498,594

(22) PCT Filed: Sep. 24, 2010

(86) PCT No.: PCT/EP2010/064131
§ 371 (c)(1),
(2), (4) Date: May 10, 2012

(87) PCT Pub. No.: WO2011/039111
PCT Pub. Date: Apr. 7, 2011

(65) Prior Publication Data
US 2012/0217199 A1      Aug. 30, 2012

Related U.S. Application Data

(60) Provisional application No. 61/247,205, filed on Sep. 30, 2009.

(51) Int. Cl.
*B01D 39/00*     (2006.01)
*B01D 39/14*     (2006.01)
(Continued)

(52) U.S. Cl.
CPC .............. *B01D 63/021* (2013.01); *B01D 61/38* (2013.01); *B01D 63/026* (2013.01); *B01D 63/04* (2013.01);*B01D 67/0088* (2013.01); *B01D 69/02* (2013.01); *B01D 69/08* (2013.01); *B01D 2319/06* (2013.01); *B01D 2323/286* (2013.01); *B01D 2325/08* (2013.01); *Y10T 29/49826* (2015.01)

(58) Field of Classification Search
CPC .. B01D 63/04; B01D 71/26; B01D 2323/286; B01D 2325/08; B01D 69/02; B01D 69/08; B23P 11/00; B29C 47/00
USPC ......... 210/500.23, 321.6, 321.8, 650, 500.36; 29/438; 264/125, 548, DIG. 48
See application file for complete search history.

(56) References Cited

U.S. PATENT DOCUMENTS 4,950,390 A * 8/1990 Szentlaszloi et al. ......... 209/164
5,174,900 A * 12/1992 Nichols et al. ................ 210/651
(Continued)

FOREIGN PATENT DOCUMENTS

EP     0442147 A2    8/1991
EP     0515034 A1    11/1992
(Continued)

*Primary Examiner* — Ana Fortuna
(74) *Attorney, Agent, or Firm* — Hammer & Associates, P.C.

(57) ABSTRACT

In at least one embodiment, the invention preferably relates to a hollow fiber membrane mat having hollow fiber membranes arranged parallel to one another and adjacent to one another, the membranes having a wall and a continuous lumen, wherein the hollow fiber membranes are connected to one another by means of a plurality of linear connecting elements which are arranged spaced apart from one another and parallel to one another and the membranes are kept apart from one another by the linear connecting elements and wherein the hollow fiber membranes are composed of a thermoplastic polymer and wherein the walls of the hollow fiber membranes arranged adjacent to one another are fluid-tight in at least one stripe extending parallel to the linear connecting elements, inside of which stripe the hollow fiber membranes are fluid-tight, preferably have a superheated steam shrinkage of at most 5%. Other embodiments of the invention preferably relate to a method for producing and/or using such hollow fiber membrane mats.

12 Claims, 4 Drawing Sheets

(51) Int. Cl.
*B29C 67/00* (2006.01)
*B29D 29/00* (2006.01)
*B01D 63/02* (2006.01)
*B01D 61/38* (2006.01)
*B01D 63/04* (2006.01)
*B01D 67/00* (2006.01)
*B01D 69/02* (2006.01)
*B01D 69/08* (2006.01)

(56) References Cited

U.S. PATENT DOCUMENTS

| | | | |
|---|---|---|---|
| 5,198,110 A * | 3/1993 | Hanai et al. | 210/321.79 |
| 5,277,821 A | 1/1994 | Coughlin et al. | |
| 5,702,601 A * | 12/1997 | Bikson et al. | 210/321.79 |
| 5,706,889 A | 1/1998 | Bach et al. | |
| 6,022,478 A * | 2/2000 | Baurmeister et al. | 210/651 |
| 6,214,232 B1 * | 4/2001 | Baurmeister et al. | 210/651 |
| 6,270,674 B1 * | 8/2001 | Baurmeister et al. | 210/649 |
| 6,271,023 B1 * | 8/2001 | Baurmeister et al. | 435/297.4 |
| 2005/0145556 A1 * | 7/2005 | Beck et al. | 210/321.65 |
| 2006/0014274 A1 * | 1/2006 | Klaus | 435/297.4 |
| 2014/0257515 A1 * | 9/2014 | So et al. | 623/23.64 |

FOREIGN PATENT DOCUMENTS

| | | |
|---|---|---|
| JP | 6-277469 | 10/1994 |
| WO | WO 98/28064 A1 | 7/1998 |
| WO | WO 98/33581 A1 | 8/1998 |
| WO | WO 00/06357 A1 | 2/2000 |
| WO | WO 02/34373 A1 | 5/2002 |

* cited by examiner

HOLLOW FIBER MEMBRANE MATS WITH FLUID IMPERMEABLE SEGMENTS AND RELATED METHODS

CROSS-REFERENCE TO RELATED APPLICATION

This application claims priority to and the benefit of U.S. Patent Application Ser. No. 61/247,205, filed on Sep. 30, 2009.

FIELD OF THE INVENTION

The invention relates to membrane contactors or modules, hollow fiber membrane contactors, membrane contactors with selected areas of impermeability, hollow fiber membrane mats with selected areas of impermeability, and/or hollow fiber membranes with selected areas of impermeability. In accordance with at least one embodiment, the hollow fiber membrane mat has hollow fiber membranes arranged parallel to one another and adjacent to one another, the membranes having a wall and a continuous lumen, wherein the hollow fiber membranes are connected to one another by means of a plurality of connecting threads which are arranged spaced apart from one another and parallel to one another and the membranes are kept apart from one another by the connecting threads, and wherein the hollow fiber membranes are composed of a thermoplastic polymer. The invention further relates to methods for producing and/or using such contactors, modules, or mats.

BACKGROUND

Membrane modules based on hollow fiber membranes or capillary membranes are used for the most varied purposes to filter or separate individual components out of a liquid or to add such components to liquids. Hollow fiber membranes as a rule have a semi-permeable wall with a porous structure via which the respective components permeate into the liquid or out of the liquid. In many cases, hollow fiber membranes are integrated in mats, such as e.g. woven or knitted mats for better processability as well as for the production of membrane modules with improved fluid dynamics. Mats of this type and multilayer wound bodies produced therefrom are described for example in U.S. Pat. No. 4,940,617 hereby incorporated by reference herein.

In the meantime, hollow fiber membrane modules have found broad use in the area of adding gases to liquids, degassing of liquids or in gas separation. Hollow fiber membrane modules, contactors, fabrics, or cartridges are described for example in U.S. Pat. No. 4,220,535, U.S. Pat. No. 5,186,832, U.S. Pat. No. 5,264,171, U.S. Pat. No. 5,284,584, and U.S. Pat. No. 5,352,361, each incorporated by reference herein.

In various processes in the pharmaceutical and chemical industries, it is necessary to run multi-step extraction processes, during which a dissolved component in an e.g. aqueous phase is initially extracted by means of an organic phase and this component is subsequently separated from the organic phase by means of a second aqueous phase. Multi-step processes of this type can be combined in a one-step process in membrane modules, which contain two groups of hollow fiber membranes, wherein the feed stream flows through the hollow fiber membranes of the one group and the stream finally containing the separated component (strip stream) flows through the hollow fiber membranes of the second group. The outer space around the hollow fiber membranes is filled with an extraction liquid, which transports the component to be extracted from the hollow fiber membranes of the first group to the hollow fiber membranes of the second group. Here, the liquid surrounding the hollow fiber membranes functions as a liquid membrane. Processes of this type are also described in the literature as CLM (contained liquid membrane) separation processes (see e.g. Majumdar et al., AIChE Journal, vol. 34 (1988), No. 7, pp. 1135-1145; Sengupta et al., AIChE Journal, vol. 34 (1988), No. 10, pp. 1698-1708; Basu et al., J. of Membrane Science, vol. 75 (1992), pp. 131-149). By means of these separation processes, components can be separated from liquid as well as from gaseous media. The membrane modules delineated in the literature cited have two groups of hollow fiber membranes which are arranged parallel to each other in the middle section of the housing.

In various applications in the area of CLM separation processes, the stability of the liquid phase, i.e. of the liquid membrane, is insufficient, and there exists a need for alternative module designs that enable a long-lasting stability of the liquid membrane.

An example for a membrane module design of this type or for a membrane contactor of this type with increased stability of the liquid phase is disclosed in U.S. patent application Ser. No. 12/112,071, filed on Apr. 30, 2008, published as US 2009/0272684 A1, published Nov. 5, 2009, hereby incorporated by reference herein. The CLM contactor described therein has a first and a second mat, composed of semipermeable hollow fiber membranes which are arranged offset with respect to one another in the longitudinal direction of the hollow fiber membranes, said mats are wound around a perforated central tube. The ends of the hollow fiber membranes offset with respect to one another of the mats wound in this way into a hollow fiber membrane wound body are embedded at one end of the CLM contactor in a first and a third sealing compound and at the other end of the contactor in a second and a fourth sealing compound, wherein a first chamber is formed between the first and third sealing compounds as well as a second chamber between the second and fourth sealing compounds. Thereby, the walls of the hollow fiber membranes of the first hollow fiber membrane mat are fluid impermeable in the area of the first chamber and the walls of the hollow fiber membranes of the second hollow fiber membrane mat are fluid impermeable in the area of the second chamber, whereas the walls of the hollow fiber membranes are porous and semi-permeable outside of the respective chambers.

SUMMARY OF THE INVENTION

In accordance with at least one aspect or embodiment thereof, the present invention addresses the need for an alternative module design that enables a long-lasting stability of the liquid membrane.

In accordance with at least certain aspects or embodiments of the present invention, there are provided improved or alternative membrane contactors or modules, hollow fiber membrane contactors, membrane contactors with selected areas of impermeability, hollow fiber membrane mats with selected areas of impermeability, and/or hollow fiber membranes with selected areas of impermeability. In accordance with at least one particular embodiment, the hollow fiber membrane mat has hollow fiber membranes arranged parallel to one another and adjacent to one another, the membranes having a wall and a continuous lumen, wherein the hollow fiber membranes are connected to one another by means of a plurality of connecting threads which are arranged spaced apart from one another and parallel to one another and the membranes are kept apart from one another by the connecting threads, and wherein the hollow fiber membranes are composed of a thermoplastic polymer.

In accordance with at least selected aspects or embodiments of the present invention, there are provided improved or alternative methods for producing and/or using membrane contactors, modules, and/or mats.

It is one object of the present invention to provide hollow fiber membrane arrangements for CLM contactors of this type with increased stability of the liquid phase, i.e. with increased stability of the liquid membrane. It is a further object of the present invention to provide a method for producing hollow fiber membrane arrangements of this type.

It is yet another object of the present invention to provide improved or novel membrane contactors (including without limitation, single or multi-stage, shelled or shell-less, cartridge type, end port, side port, 3 port, 4 port, 6 port, cylindrical, rectangular, and/or the like), filters, cartridges, or modules, hollow fiber membrane contactors, filters, cartridges, or modules, membrane contactors with selected areas of impermeability, impermeable sections or portions thereof, hollow fiber membrane arrangements, membrane mats or fabrics, and/or the like. It is a further object of the present invention to provide a method for producing and/or using such membrane contactors, filters, cartridges, or modules, hollow fiber membrane contactors, filters, cartridges, or modules, membrane contactors with selected areas of impermeability, impermeable sections or portions thereof, hollow fiber membrane arrangements, or membrane mats or fabrics.

At least the object according to the invention to provide hollow fiber membrane arrangements for CLM contactors with increased stability of the liquid phase is addressed or solved by a hollow fiber membrane mat having hollow fiber membranes arranged parallel to one another and adjacent to one another, said membranes having a wall and a continuous lumen, wherein the hollow fiber membranes are connected to one another by means of a plurality of linear connecting elements which are arranged spaced apart from one another and parallel to one another and said membranes are kept apart from one another by the linear connecting elements, and wherein the hollow fiber membranes are composed of a thermoplastic polymer, characterized in that the wall of the hollow fiber membranes arranged adjacent to one another is fluid-tight in at least one stripe extending parallel to the linear connecting elements within the hollow fiber membrane mat, that the linear connecting elements have a melting temperature that is at least as high as the melting temperature of the thermoplastic polymer composing the hollow fiber membranes, and that the linear connecting elements outside of the at least one stripe extending parallel to the linear connecting elements, inside of which stripe the hollow fiber membranes are fluid-tight, preferably have a superheated steam shrinkage of at most 5% at a temperature of 121° C. and an atmospheric humidity of 100% (saturated steam).

This object is further solved or addressed by a method for producing a hollow fiber membrane mat with at least one stripe-shaped area in which the wall of the hollow fiber membranes is fluid impermeable, wherein the method comprises the steps:

a) providing a hollow fiber membrane mat having hollow fiber membranes arranged parallel to one another and adjacent to one another, said membranes having a porous, semi-permeable wall and a continuous lumen, wherein the hollow fiber membranes are connected to one another by means of a plurality of linear connecting elements which are arranged spaced apart from one another and parallel to one another and said membranes are kept at a distance by the linear connecting elements and wherein the hollow fiber membranes are composed of a thermoplastic polymer, and the linear connecting elements have a melting temperature that is at least as high as the melting temperature of the thermoplastic polymer composing the hollow fiber membranes, and the connecting threads preferably have a superheated steam shrinkage of at most 5% at a temperature of 121° C. and an atmospheric humidity of 100%, b) transporting the hollow fiber membrane mat by means of a transport equipment and at a transport speed in the direction of the extension of the linear connecting elements and under a tension acting in the transport direction through at least one heating device extending in the transport direction having heating elements arranged above and below the hollow fiber membrane mat and at a distance from the surface of the hollow fiber membrane mat as well as from one another via which heat is supplied to the hollow fiber membranes in a treatment zone over a width B transverse to the transport direction, whereby the hollow fiber mat is treated in a treatment area, and simultaneously c) gripping of the hollow fiber membrane mat in zones, which are located to the right and left of the at least one heating device when viewed in the transport direction, by clamping devices, which are adjustable regarding their contact pressure perpendicular to the flat extension of the hollow fiber membrane mat, by means of which clamping devices the hollow fiber membranes are held under tension transverse to the transport direction, wherein in the treatment zone the temperature is preferably adjusted to a temperature 5 to 15% below the melting temperature of the polymer composing the hollow fiber membranes by means of the heating elements so that a shrinkage of the hollow fiber membranes is initiated in the treatment area, and wherein by adjusting the contact pressure of the clamping devices, the hollow fiber membranes are held under tension in their longitudinal extension so that the hollow fiber membranes retain a straight-line course in their longitudinal extension.

In accordance with at least selected embodiments or aspects of the invention, the treated zone, band or stripe may be fluid impermeable or fluid-tight, such as the wall of the hollow fiber membranes in the treatment areas becomes impermeable to fluid passage due to the temperature treatment during passage through a treatment zone between radiant heat elements. The temperature treatment of the hollow fiber membranes may initiate a shrinkage or contraction of the hollow fiber membranes in the areas treated, whereby the pores there apparently collapse and the porous structure disappears.

Alternatively, one can control or change the desired overall permeability from full permeability (no heated sections) to little or no permeability (all heated sections) based on the desired permeability of the membrane contactor, filter, cartridge, or module. For example, one may change a very porous membrane contactor to a less porous membrane contactor by heat treating several stripes along its length.

Further, one may desire to close the pores in an initial section of a membrane contactor, filter, cartridge, or module, hollow fiber membrane contactor, hollow fiber membrane arrangement, mat, fabric, or the like to provide a heat transfer section upstream of a porous or permeable fluid transfer section. Such a dual function module having a heat transfer section and a fluid transfer (or separation or filtration) section may replace a multi-module system having a heat transfer module and a fluid transfer module.

At least selected embodiments of the invention preferably relate to a hollow fiber membrane mat having hollow fiber membranes arranged parallel to one another and adjacent to one another, said membranes having a wall and a continuous lumen, wherein the hollow fiber membranes are connected to one another by means of a plurality of linear connecting elements which are arranged spaced apart from one another and parallel to one another and said membranes are kept apart from one another by the linear connecting elements and wherein the hollow fiber membranes are composed of a thermoplastic polymer and wherein the walls of the hollow fiber membranes arranged adjacent to one another are fluid-tight in at least one stripe extending parallel to the linear connecting elements inside of the hollow fiber membrane mat. The linear connecting elements have a preferred melting temperature that is at least as high as the melting temperature of the thermoplastic polymer composing the hollow fiber membranes, and the linear connecting elements outside of the at least one stripe extending parallel to the linear connecting elements, inside of which stripe the hollow fiber membranes are fluid-tight, preferably have a superheated steam shrinkage of at most 5%. At least selected embodiments of the invention preferably further relate to a method for producing and/or using such hollow fiber membrane mats.

BRIEF DESCRIPTION OF THE DRAWINGS

FIGS. 1 and 2 are respective before and after (or untreated and treated) images related to Example 1 below.

FIGS. 3 and 4 are respective before and after (or untreated and treated) images related to Example 2 below.

FIGS. 5 and 6 are respective before and after (or untreated and treated) images related to Example 3 below.

DETAILED DESCRIPTION

In accordance with at least one aspect or embodiment thereof, the present invention addresses the need for an alternative module design that enables a long-lasting stability of the liquid membrane.

Figure 7:
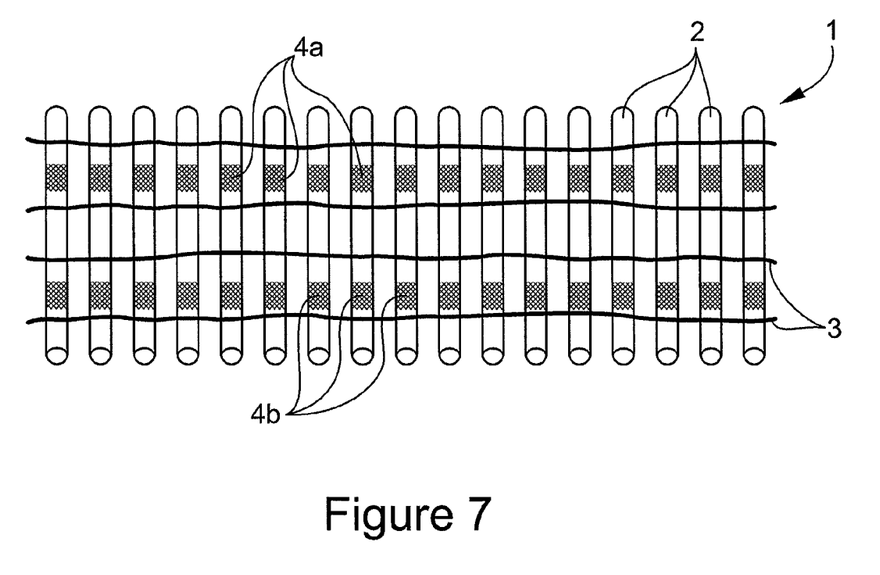
FIG. 7 is a schematic illustration of an embodiment of the invention.

In accordance with at least certain aspects or embodiments of the present invention, there are provided improved or alternative membrane contactors or modules, hollow fiber membrane contactors, membrane contactors with selected areas of impermeability, hollow fiber membrane mats with selected areas of impermeability, and/or hollow fiber membranes with selected areas of impermeability. In accordance with at least one particular embodiment, the hollow fiber membrane mat 1 has hollow fiber membranes 2 arranged parallel to one another and adjacent to one another, the membranes having a wall and a continuous lumen, wherein the hollow fiber membranes are connected to one another by means of a plurality of connecting threads 3 which are arranged spaced apart from one another and parallel to one another and the membranes are kept apart from one another by the connecting threads, and wherein the hollow fiber membranes are composed of a thermoplastic polymer.

In accordance with at least selected aspects or embodiments of the present invention, there are provided improved or alternative methods for producing and/or using membrane contactors, modules, and/or mats.

Within the context of the present invention, fluid impermeable and fluid-tight are understood to mean that the wall of the hollow fiber membranes in the treatment area or treated area is impermeable, i.e. sealed against a convective transport or passage of gases or liquids. When examining the fluid impermeable or fluid-tight hollow fiber membranes under scanning electron microscopic at a 5000× magnification, no pores are visible at least in one of the surfaces of the walls of the hollow fiber membranes in the at least one treated area or in the at least one stripe 4a and/or 4b extending parallel to the linear connecting elements, whereas this surface has pores outside of the at least one treated area or the at least one stripe extending parallel to the linear connecting elements.

By the heating elements, heat may be supplied in the treatment zone to the hollow fiber mat by convection, e.g. by using hot-air blowers. The heat may also be supplied by conduction, e.g. in cases when the hollow fiber mat is covered with temperature stable carrier belts as will be described below.

For the preferred method according to at least one embodiment of the invention it is important that during the temperature treatment of the hollow fiber membranes in the treatment zone movements of the hollow fiber membranes towards each other during the application of heat is avoided or at least are kept low. More particularly, the hollow fiber membranes should not move toward one another to an extent, that could lead to a contact of the hollow fiber membranes with one another and to a fusing or adhering of the hollow fiber membranes with one another in the treatment areas. Therefore, in a preferred embodiment of the process of the invention, the at least one heating device extending in the transport direction has radiant heating elements arranged above and below the hollow fiber membrane mat and at a distance from the surface of the hollow fiber membrane mat as well as to one another. The use of radiant heating elements instead of e.g. hot air blowers has the additional advantage that a sharp transition from the treated to the untreated area of the hollow fiber membranes can be obtained instead of a transition extending over several millimeters or even centimeters, which, in regard to the applications in e.g. CLM contactors, would be a disadvantage.

With regard to the radiant heating elements, in a preferred embodiment they can be hotplates, which are heated to a sufficiently high temperature so that the temperature at the hollow fiber membrane mat lies 5 to 15% below the melting temperature of the polymer composing the hollow fiber membranes. The hotplates can have a rectangular contour with a width B transverse to the transport direction corresponding to the intended width of the stripe or segment in the hollow fiber membrane mat in which stripe the wall of the hollow fiber membranes is fluid-tight. The length L of the hotplates in the transport direction is determined considering the transport speed according to the required residence time of the hollow fiber membranes in the area of the radiant heat elements and can lie within the preferred range of approximately 5 cm to approximately 20 cm. The distance of the hotplates to one another is as a rule a few millimeters and lies preferably in the range of 4 to 8 mm.

The radiant heating elements can also comprise infrared (IR) radiators that are located at a suitable distance to the hollow fiber membrane mat so that a temperature is present at the hollow fiber membrane mat which preferably lies 5 to 15% below the melting temperature of the polymer composing the hollow fiber membranes. In this case it may be advantageous to limit the infrared radiation, e.g. by appropriately dimensioned apertures, to the required treatment area of the hollow fiber membrane mat.

With respect to fluid impermeable or fluid-tight hollow fiber membranes, the wall of the hollow fiber membranes in the treatment areas becomes impermeable to fluid passage due to the temperature treatment during passage through the treatment zone between the radiant heat elements. The temperature treatment of the hollow fiber membranes at a preferred temperature 5 to 15% below the melting temperature of the polymer composing the hollow fiber membranes initiates a shrinkage or contraction of the hollow fiber membranes in the areas treated, whereby the pores there apparently collapse and the porous structure disappears.

Alternatively, one can control or change the desired overall permeability from full permeability (no heated sections) to little or no permeability (all heated sections) based on the desired permeability of the membrane contactor, filter, cartridge, or module. For example, one may change a very porous membrane contactor to a less porous membrane contactor by heat treating several stripes along its length.

Further, one may desire to close the pores in an initial section of a membrane contactor, filter, cartridge, or module, hollow fiber membrane contactor, hollow fiber membrane arrangement, mat, fabric, or the like to provide a heat transfer section upstream of a porous or permeable fluid transfer section. Such a dual function module having a heat transfer section and a fluid transfer (or separation or filtration) section may replace a multi-module system having a heat transfer module and a fluid transfer module.

The length of the treatment zone and thereby also the length of the heating elements is to be determined in the transport direction, so that considering the transport speed of the hollow fiber membrane mat the residence time of the hollow fiber membranes in the treatment zone is sufficient to allow the shrinkage process to proceed to the desired extent, for example, that the porous structure disappears and the wall of the hollow fiber membranes in the treated area becomes fluid impermeable. The residence time of the hollow fiber membrane mat in the treatment zone lies preferably in the range of 0.5 to 5 minutes, more preferably between 1 and 3 minutes.

It was found that the porous structure in the treated areas of the hollow fiber membranes disappears due to the temperature application not only on the outer side of the hollow fiber membrane but, at a sufficient residence time, also on the inner side facing the lumen. In hollow fiber membranes that prior to the treatment had a distinct porous structure on the surfaces in the treatment areas, as proven by an examination using a scanning electron microscope, sealed surfaces free from pores on the outer as well as on the inner side were obtained as a result of the treatment according to the invention. Basis for the judgment was the examination of the surfaces at 5000× magnification using a scanning electron microscope. In a preferred embodiment of the hollow fiber membrane mat according to the invention or of the hollow fiber membrane mat produced according to the method of the invention, the wall of the hollow fiber membranes is free of pores in the at least one stripe on the surface facing the lumen as well as on the surface facing outward.

During the preferred temperature treatment of the hollow fiber membrane mats in accordance with at least selected embodiments, it is of importance on the one hand that the hollow fiber membranes are held under tension in their longitudinal direction, i.e. in the direction of their extension, in order to prevent a crimping together as well as a complete collapse of the hollow fiber membranes and with this a choking of the lumen of the hollow fiber membranes in the at least one treatment area. On the other hand, it is important that the linear connecting elements have a melting temperature that is at least as high as the melting temperature of the thermoplastic polymer composing the hollow fiber membranes, and that the linear connecting elements are low-shrinkage, i.e. they have a superheated steam shrinkage of preferably at most 5% at a temperature of 121° C. and at an atmospheric humidity of 100% (saturated steam). Otherwise, the linear connecting elements may have a shrinkage that is too high under the temperature application, which could result in the constriction of the hollow fiber membranes by the linear connecting elements and—depending on the connecting elements used—even in a choking of the hollow fiber lumen. Moreover, in case of a too high shrinkage, the adjacent hollow fiber membranes may come into contact and may fuse together, thereby leading to undesirable stiff segments in the hollow fiber mat. More preferably, the linear connecting elements of the hollow fiber membrane mat according to at least certain embodiments of the invention or produced by the method according to at least selected embodiments of the invention have a superheated steam shrinkage of at most 2% at a temperature of 121° C. and at an atmospheric humidity of 100%. To determine the superheated steam shrinkage, the linear connecting element material is treated for 30 minutes at a temperature of 121° C. and at an atmospheric humidity of 100% (saturated steam).

Finally, it is preferred in at least certain embodiments that the hollow fiber membrane mat is held under a tension acting in the transport direction, i.e. in the direction of the extension of the linear connecting elements, during passage through the heating device. By this means, the hollow fiber membranes also remain spaced apart from one another during the heat application and an adhesion of adjacent hollow fiber membranes is prevented. The tension in transport direction thereby can only be applied via the linear connecting elements of the hollow fiber membrane mat, since the hollow fiber membranes themselves are not in contact with each other. Therefore the tension acting in the transport direction is preferably in the range of 5 to 15 cN per linear connecting element which is present over the width of the hollow fiber membrane mat (1 cN=1.02 g). To achieve a uniform tension over the mat width, it can be advantageous that the hollow fiber membrane mat is fed over a support, e.g. in the form of a plate, or is laid on a carrier belt driven at the transport speed.

As described, the temperature treatment of the hollow fiber membranes at a temperature somewhat below the melting temperature of the polymer composing the hollow fiber membranes initiates shrinkage or contraction of the hollow fiber membranes in the treatment areas, whereby the pores in these areas apparently collapse and the porous structure disappears (or is reduced). Moreover, a crimping together as well as a complete collapse of the hollow fiber membranes and with this a choking of the lumen of the hollow fiber membranes can occur. To counteract this, in the preferred method according to at least selected embodiments of the invention, the hollow fiber membrane mat is gripped in zones to the right and left of the at least one heating device by clamping devices, which are adjustable regarding their contact pressure perpendicular to the flat extension of the hollow fiber membrane mat. Here, the contact pressure should be adjusted so that the hollow fiber membranes can indeed shrink in their longitudinal extension, however they are held under tension so that they retain a straight-line course. It should be noted here that at a contact pressure that is too high, the necessary movement in the direction of extension of the hollow fiber membranes resulting from the shrinkage initiated by the temperature treatment in the treatment area of the hollow fiber membrane mat is suppressed. As a result, capillaries in the treatment area shrink in their outer diameter, i.e. become thinner or even tear if the elongation at break is exceeded. On the other hand, a contact pressure that is too low leads to a mat that contracts uncontrolled in the treatment area and warping and/or kinking of the capillaries occurs, or the lumen of the hollow fiber membranes collapses also. The contact pressure suitable in each case can be visually determined by simple tests.

The clamping devices can be e.g. metal belts fed via driven rollers, which belts press against the hollow fiber membrane mat and which belts move along at the speed with which the hollow fiber membrane mat is fed through the at least one heating device, i.e. at the transport speed. The clamping devices can however also be static elements, e.g. in the form of skid-shaped and adjustable clamping shoes by means of which the hollow fiber membrane mat is preferably gripped on the side edges and by which a contact pressure is exerted on the mat. The clamping devices must of course be located along the transport direction of the hollow fiber membrane mat at the height of the treatment zone.

According to the invention, the hollow fiber membranes arranged in the hollow fiber membrane mat are composed of a thermoplastic polymer. In particular synthetic polymers selected from the group of polyolefins, such as e.g. polyethylene, polypropylene, polybutylene, polyisobutylene or fluorinated polyolefins, sulfone polymers, such as e.g. polysulfone, polyethersulfone, polyarylethersulfone, polyamides, polyetherimides, polyacrylonitriles, polyesters, polyetherimides, polyetheretherketones (PEEK), polymethylmethacrylates (PMMA), polymethyl pentene (PMP), ethyl vinyl alcohols (EVA), copolymers of these polymers or blends or mixtures of these polymers come into consideration here. Particularly preferred, the polymer composing the hollow fiber membranes is a polyolefin, more particularly preferred polypropylene. The hollow fiber membrane mat may be made up of more than one type and/or size of hollow fiber membranes.

The hollow fiber membranes are preferably connected in the hollow fiber membrane mat according to the invention by means of a plurality of linear connecting elements spaced apart from one another and running parallel to one another. The linear connecting elements by which the hollow fiber membranes are incorporated into the mat and by which the hollow fiber membranes are kept at a distance with respect to each other may be strip-shaped elements which may be laminated onto the hollow fiber membranes or which may be adhered to the hollow fiber membranes by an adhesive. The linear connecting elements may also be made of a ribbon-like material. In a preferred embodiment of the hollow fiber membrane mat and of the process according to the invention, the linear connecting elements are connecting threads, i.e. are yarns or fibers which connect the hollow fiber membranes with each other. The connecting threads may be entwined around the single hollow fiber membranes. The hollow fiber membranes in the mat are preferably connected by means of connecting threads using a knitting method, i.e. the hollow fiber membrane mat is preferably a knitted mat. In an especially preferred embodiment, the connecting threads are multifilament yarns. Multifilament polyester yarns are most preferred for the connecting threads. Within the context of the present invention, preferred yarns have a melting temperature that is as high as the melting temperature of the thermoplastic polymer composing the hollow fiber membranes and that have a superheated steam shrinkage of preferably at most 5% and more preferably have a superheated steam shrinkage of at most 2% at a temperature of 121° C. and at an atmospheric humidity of 100%. The hollow fiber membranes may be connected in the hollow fiber membrane mat by means of a plurality of different types and/or sizes of linear connecting elements. Further, the hollow fiber membranes or mats may be spaced apart by spacers, may be connected or fixed in the hollow fiber membrane mat, contactor, filter, cartridge, or module by means of potting, such as epoxy resin at each end, and/or tube sheets, and/or may be formed about a perforated center tube.

Regarding the transport equipment used in step b) of the preferred method according to at least certain embodiments of the invention, it can be conventional equipment such as that used for continuous transport of sheet-like products. For example, the transport equipment can have driven rollers from which the hollow fiber mat is unwound or on which the hollow fiber mat is wound in a controlled manner. The transport equipment can additionally have pairs of rollers by means of which the hollow fiber mat, together with, for example, a transport belt is fed to and withdrawn from the at least one heating device. It is advantageous for a gentle and uniform transport of the hollow fiber membrane mat through the at least one heating device, if the hollow fiber membrane mat is transported through the heating device between carrier belts located above and below the hollow fiber membrane mat and covering the hollow fiber membrane mat. Covering the hollow fiber membrane mat in the treatment zone between the heating elements at the same time has the advantage that the hollow fiber membranes are fed in a gentle manner through the treatment zone and in particular vertical or horizontal movements of the hollow fiber membranes in this area resulting from the temperature treatment are also prevented. Movements of this type can for example lead to contact between adjacent hollow fiber membranes and result in an adhesion of the hollow fiber membranes.

The carrier belts can preferably be stretched polymer films with a sufficient strength and a low elongation, such as e.g. those made of polytetrafluoroethylene. In a further preferred embodiment, the carrier belts can be fine fabrics made of temperature-stable yarns, such as e.g. fabrics made of polytetrafluoroethylene and/or aramid yarns. The hollow fiber membrane mat is preferably covered by the carrier belts over its entire width and therefore also in the areas that pass through the treatment zones, wherein the carrier belts therefore are composed of a temperature-stable material and sticking between the mat and carrier belts does not occur, so that the carrier belts can be withdrawn, unproblematically and without leaving a residue, from the hollow fiber membrane mat after passage through the at least one heating device. The carrier belts are therefore preferably non-stick. The carrier belts may also act as spacers between the heating elements and the hollow fiber mat during passage through the treatment zone. The carrier belts located on the upper and lower sides are preferably driven and transport the hollow fiber membrane mat at the required speed in the transport direction, and therefore simultaneously constitute the transport device.

The use of carrier belts which cover the hollow fiber membrane mat on its entire upper and lower side has the further advantage that the hollow fiber membrane mat can be fed uniformly and warp-free through the treatment equipment containing at least one heating device. In addition, a gentle gripping and feeding through the clamping devices, which effect a stabilization of the hollow fiber membrane mat in the direction of the extension of the hollow fiber membranes, is also possible. Therefore, in a preferred embodiment of the method according to the invention, the hollow fiber membrane mat is covered in the area of its side edges with carrier belts and together with the covering carrier belts is fed through skid-shaped clamping devices.

Depending on the use of the hollow fiber mat according to the invention or produced by the method according to the invention, it can be necessary that this mat has more than one area or more than one stripe in which the walls of the hollow fiber membranes arranged in the mat are fluid impermeable. To produce this type of hollow fiber membrane mats, the hollow fiber membrane mat is fed through at least one second heating device which is arranged transverse to the transport direction at a distance from the first heating device, by means of which at least one further stripe shaped area is created in the extension direction of the linear connecting elements, in which area the walls of the hollow fiber membranes are fluid impermeable. The at least one second heating device thereby preferably can have the same design as the first heating device.

Due to the fluid impermeable areas, the preferred hollow fiber membrane mats according to the invention or the preferred hollow fiber membrane mats produced according to the method according to the invention can be best used in e.g. CLM contactors, which require a high stability of the liquid membrane formed in these contactors.

FIGS. 1 to 6 are respective images of hollow fiber membrane wall structures or surfaces at 5000× magnification made using a scanning electron microscope.

At least selected embodiments of the invention will now be described in more detail by way of the following examples:

EXAMPLE 1

A hollow fiber membrane knitted mat with a width of 750 mm was provided. The hollow fiber membranes arranged in the hollow fiber membrane mat were stretched polypropylene hollow fiber membranes (type X40, Celgard, LLC of Charlotte, N.C.) with a throughout porous wall, a diameter of 400 µm and a wall thickness of 40 µm. The hollow fiber membranes were bound into the hollow fiber membrane mat by means of multifilament polyester threads, wherein 150 warp threads, i.e. connecting threads were distributed uniformly over the width of the mat in the transport direction. The polyester threads had a superheated steam shrinkage of less than 1%.

The hollow fiber membrane mat was withdrawn from a roll at a transport speed of 7.6 cm/min, fed together with driven carrier belts made of a fabric made of polytetrafluoroethylene yarns and aramid yarns on the upper and lower sides of the mat through a heating device and after the temperature treatment wound onto a roll with a tension of approximately 10 cN per warp thread.

The heating device comprised a radiant heat element located over and under the mat respectively. Each radiant heat element comprised a hotplate made of aluminum having a width of 125 mm and a length of 100 mm which were heated by two heating cartridges per hotplate to a temperature of 155° C. The hotplates were spaced 5 mm from one another; the hollow fiber membrane mat, together with the carrier belts, was fed through in the center between the hotplates. By this means, also in the area of the hollow fiber membrane mat the temperature was approximately 155° C., which temperature was approximately 7% below the melting temperature of the polypropylene.

In the area of the side edges, skid-shaped clamping devices were pressed against the hollow fiber membrane mat, under which clamping devices the hollow fiber membrane mat was drawn through together with the carrier belts. The contact pressure of the clamping devices was adjusted so that a straight-line course of the hollow fiber membranes was guaranteed in the area of the heating device, however simultaneously shrinkage of the hollow fiber membranes was possible in the longitudinal direction in the area of the heating device as a result of the temperature application.

Figure 1:
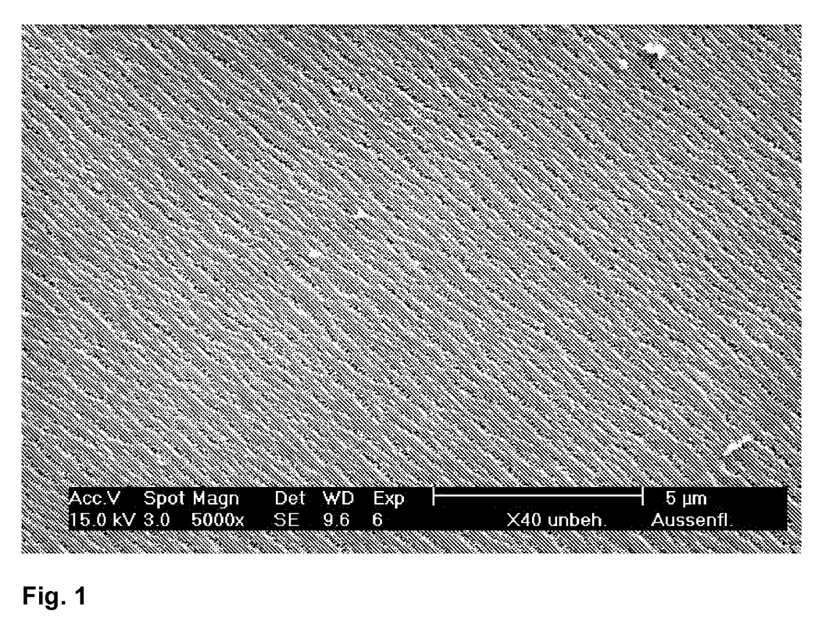
FIGS. 1 to 6 are respective images of hollow fiber membrane wall structures or surfaces at 5000× magnification made using a scanning electron microscope.
Figure 2:
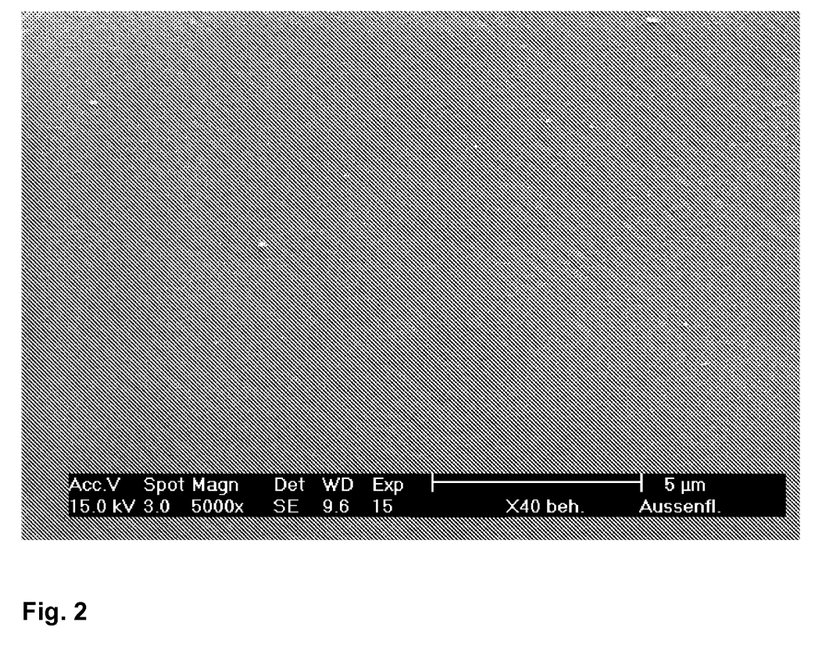
Figure 3:
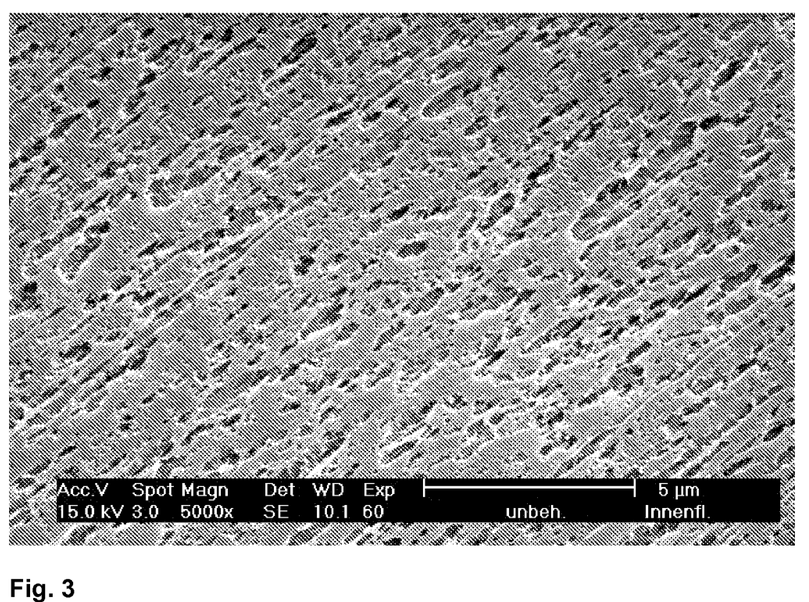

During the passage through the heating device, the hollow fiber membranes shrank in the treatment area by approximately 35-40%. After passage through the heating zone, the structure of the hollow fiber membrane wall was altered, which was recognized by a change in the optical appearance from white to transparent. In the transparent areas of the hollow fiber membranes, the originally porous wall structure (FIG. 1) had transformed into a dense film structure (FIG. 2). The hollow fiber membrane mat thus treated had a stripe extending parallel to the connecting threads, in which stripe the wall of the polypropylene hollow fiber membranes was fluid impermeable.

EXAMPLE 2

The procedure was the same as in Example 1. Instead of the hollow fiber membrane mat made of stretched polypropylene hollow fiber membranes used in Example 1, a hollow fiber membrane mat made of unstretched polypropylene hollow fiber membranes (type PP 50280, Membrana GmbH of Wuppertal, Germany) was provided.

Figure 4:
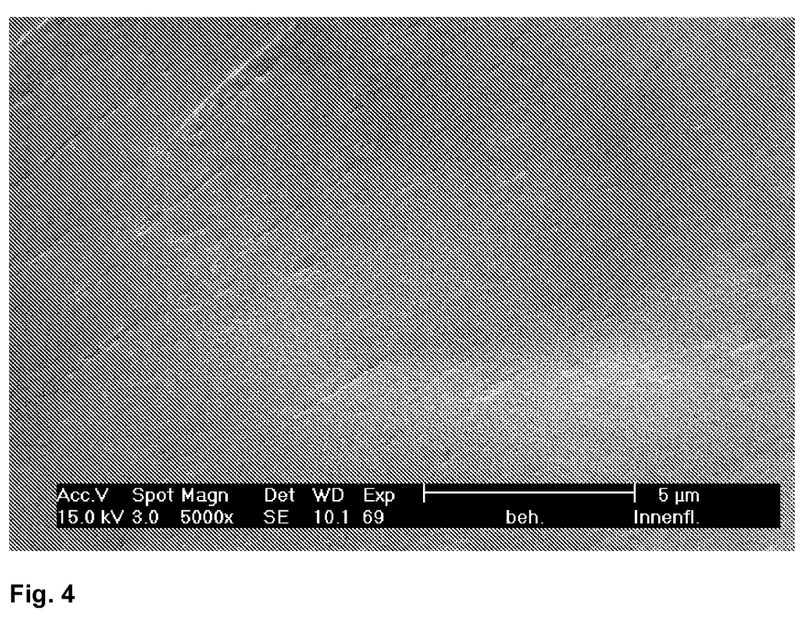
Figure 5:
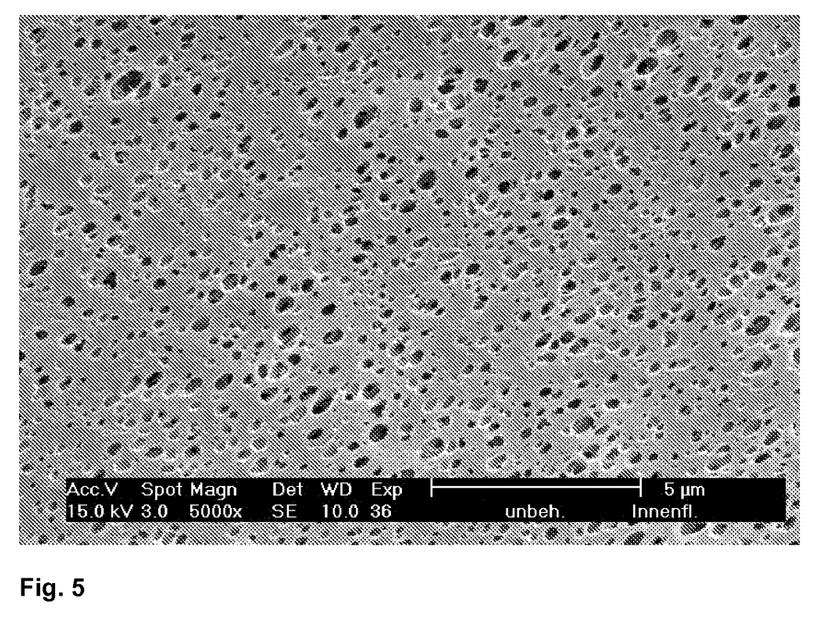

After passage through the treatment zone, the structure of the hollow fiber membrane wall was altered, which was recognized by a change in the optical appearance from white to transparent. As proven by examination in the scanning electron microscope, in the treated, transparent areas of the hollow fiber membranes, the original porous wall structure (FIG. 3) had changed into a fluid-tight film structure (FIG. 4).

EXAMPLE 3

The procedure was the same as in Example 1. Contrary to Example 1, hollow fiber membranes made from poly-(4-methyl-1-pentene) were used (type 90200, Membrana GmbH). The hotplates were heated to 210° C. and thereby to a temperature approximately 15% below the melting temperature of poly-(4-methyl-1-pentene).

Figure 6:
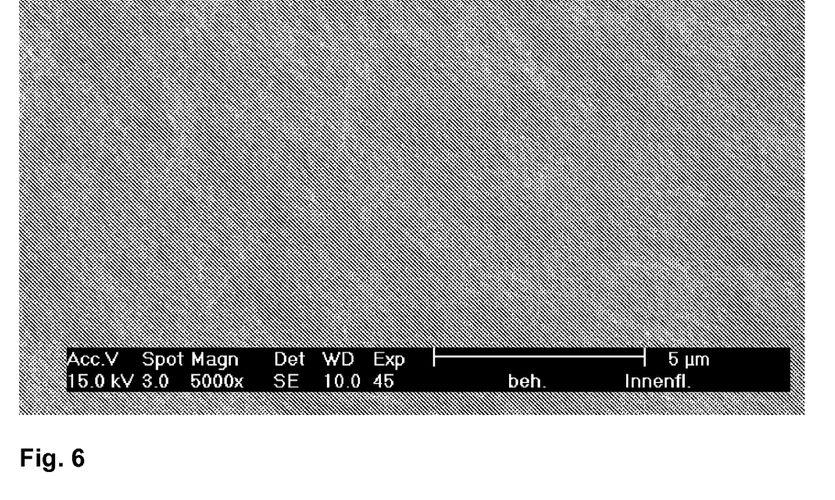

Due to the temperature treatment, the hollow fiber membranes made of poly-(4-methyl-1-pentene) likewise changed in appearance from white to transparent. The original porous inner surface of the hollow fiber membranes facing the lumen (FIG. 5) was dense after the temperature treatment (FIG. 6). For these poly-(4-methyl-1-pentene) hollow fiber membranes, too, a mat was obtained for which the hollow fiber membrane walls were fluid-tight in a stripe parallel to the connecting threads.

COMPARATIVE EXAMPLE 1

The procedure was the same as in Example 1. Contrary to Example 1, the hot plates were heated to a temperature of 170° C. and thereby to a temperature just above the melting temperature of the polypropylene.

As a result of the high temperature stress in the treatment zone, a fusing of adjacent hollow fiber membranes and a collapse of the lumina of the hollow fiber membranes was found for a large part of the hollow fiber membranes.

COMPARATIVE EXAMPLE 2

The procedure was the same as in Example 3. Contrary to Example 3, the hotplates were heated to 195° C. and thereby to a temperature approximately 20% below the melting temperature of poly-(4-methyl-1-pentene).

In the treatment area, there was no change in the appearance of the hollow fiber membranes. The hollow fiber membranes were still white after the treatment, i.e. the walls of the hollow fiber membranes continued to have a porous structure in this area.

At least selected embodiments of the invention preferably relate to a hollow fiber membrane mat having hollow fiber membranes arranged parallel to one another and adjacent to one another, said membranes having a wall and a continuous lumen, wherein the hollow fiber membranes are connected to one another by means of a plurality of linear connecting elements which are arranged spaced apart from one another and parallel to one another and said membranes are kept apart from one another by the linear connecting elements and wherein the hollow fiber membranes are composed of a thermoplastic polymer and wherein the walls of the hollow fiber membranes arranged adjacent to one another are fluid-tight in at least one stripe extending parallel to the linear connecting elements inside of the hollow fiber membrane mat. The linear connecting elements preferably have a melting temperature that is at least as high as the melting temperature of the thermoplastic polymer composing the hollow fiber membranes, and the linear connecting elements outside of the at least one stripe extending parallel to the linear connecting elements, inside of which stripe the hollow fiber membranes are fluid-tight, have a superheated steam shrinkage of at most 5%. At least selected embodiments of the invention preferably further relate to a method for producing and/or using such hollow fiber membrane mats.

In accordance with at least selected embodiments of the invention, a hollow fiber membrane mat has hollow fiber membranes arranged parallel to one another and adjacent to one another, the membranes having a wall and a continuous lumen, wherein the hollow fiber membranes are connected to one another by means of a plurality of linear connecting elements which are arranged spaced apart from one another and parallel to one another and the hollow fiber membranes are kept apart from one another by the linear connecting elements and wherein the hollow fiber membranes are composed of at least one thermoplastic polymer, characterized in that the walls of the hollow fiber membranes arranged adjacent to one another are fluid-tight in at least one stripe extending parallel to the linear connecting elements within the hollow fiber membrane mat, that the linear connecting elements have a melting temperature that is at least as high as the melting temperature of the thermoplastic polymer composing the hollow fiber membranes, and that the linear connecting elements outside of the at least one stripe extending parallel to the linear connecting elements, inside of which stripe the hollow fiber membranes are fluid-tight, have a superheated steam shrinkage of at most 5% at a temperature of 121° C. and an atmospheric humidity of 100%.

The above hollow fiber membrane mat, characterized in that the linear connecting elements have a superheated steam shrinkage of at most 2% at a temperature of 121° C. and an atmospheric humidity of 100%.

The above hollow fiber membrane mat, characterized in that the polymer composing the hollow fiber membranes is a polyolefin.

The above hollow fiber membrane mat, characterized in that the linear connecting elements are connecting threads.

The above hollow fiber membrane mat, characterized in that the connecting threads are multifilament polyester yarns.

The above hollow fiber membrane mat, characterized in that the connecting threads holding the hollow fiber membranes at a distance are introduced via a knitting method.

The above hollow fiber membrane mat, characterized in that the walls of the hollow fiber membranes in the at least one stripe are pore-free on the surface facing the lumen as well as on the surface facing outward.

In accordance with at least certain embodiments of the invention, a method for producing a hollow fiber membrane mat with at least one stripe-shaped area in which the walls of the hollow fiber membranes are fluid impermeable, includes the following steps:

a) providing a hollow fiber membrane mat having hollow fiber membranes arranged parallel to one another and adjacent to one another, the membranes having at least one of porous, microporous, and semi-permeable wall and a continuous lumen, wherein the hollow fiber membranes are connected to one another by means of a plurality of linear connecting elements which are arranged spaced apart from one another and parallel to one another and the membranes are kept at a distance by the linear connecting elements and wherein the hollow fiber membranes are composed of a thermoplastic polymer, and the linear connecting elements have a melting temperature that is at least as high as the melting temperature of the thermoplastic polymer composing the hollow fiber membranes, and the linear connecting elements have a superheated steam shrinkage of at most 5% at a temperature of 121° C. and an atmospheric humidity of 100%, b) transporting the hollow fiber membrane mat by means of a transport equipment and at a transport speed in the direction of the extension of the linear connecting elements and under a tension acting in the transport direction through at least one heating device extending in the transport direction having heating elements arranged above and below the hollow fiber membrane mat and at a distance from the surface of the hollow fiber membrane mat as well as from one another via which heat is supplied to the hollow fiber membranes in a treatment zone over a width B transverse to the transport direction, whereby the hollow fiber mat is treated in a treatment area, and simultaneously c) gripping of the hollow fiber membrane mat in zones, which are located to the right and left of the at least one heating device when viewed in the transport direction, by clamping devices, which are adjustable regarding their contact pressure perpendicular to the flat extension of the hollow fiber membrane mat, by means of which clamping devices the hollow fiber membranes are held under tension transverse to the transport direction, wherein in the treatment zone the temperature is adjusted to a temperature 5 to 15% below the melting temperature of the polymer composing the hollow fiber membranes by means of the heating elements so that a shrinkage of the hollow fiber membranes is initiated in the treatment area, and wherein by adjusting the contact pressure of the clamping devices, the hollow fiber membranes are held under tension in their longitudinal extension so that the hollow fiber membranes retain a straight-line course in their longitudinal extension.

The above method, characterized in that the hollow fiber membrane mat is transported between a carrier belt arranged above and below the hollow fiber membrane mat and covering the hollow fiber membrane mat at least in the area of the at least one heating device through the at least one first heating device.

The above method, characterized in that the hollow fiber membrane mat is covered in the area of its side edges by the carrier belts and together with the covering carrier belts is fed by skid-shaped clamping devices.

The above method, characterized in that the length of the heating elements in the transport direction as well as the transport speed are adjusted so that the residence time of the hollow fiber membrane mat in the treatment zone lies in the range of 0.5 to 5 min.

The above method, characterized in that the heating elements are radiant heating elements.

The above method, characterized in that the radiant heating elements are flat hotplates.

The above method, characterized in that the distance between the hotplates is 4 to 8 mm.

The above method, characterized in that the hollow fiber membrane mat is fed through at least one second heating device which is arranged transverse to the transport direction at a distance from the first heating device, by means of which at least one further stripe-shaped area is created in the extension direction of the linear connecting elements, in which area the walls of the hollow fiber membranes are fluid impermeable.

The above method, characterized in that the tension acting in the transport direction lies in the range of 5 to 15 cN per linear connecting element.

The above method, characterized in that the polymer composing the hollow fiber membranes is a polyolefin.

The above method, characterized in that the linear connecting elements are connecting threads, members or fibers.

The above method, characterized in that the connecting threads are multifilament polyester yarns.

A hollow fiber membrane mat with at least one stripe-shaped area in which the walls of the hollow fiber membranes are fluid impermeable and formed by the above method.

In at least one embodiment, there is provided a hollow fiber membrane mat having hollow fiber membranes arranged adjacent to one another, the membranes having a wall and a continuous lumen, wherein the hollow fiber membranes are composed of a thermoplastic polymer, characterized in that the walls of the hollow fiber membranes arranged adjacent to one another are at least one of reduced porosity and fluid-tight in at least one heat formed band, stripe or section extending along the length of the mat.

It is believed that the heat setting and/or shrinkage control steps in typical hollow fiber production processes may play a role in the heat shrinkage (pore collapse) mechanism utilized to close or reduce the porosity of the pores in accordance with the present invention. If the hollow fibers are heated to a higher temperature than was used to do the heat setting during hollow fiber production, then the process that created the pore structure starts to reverse and the existing pores will close up. This may happen because the surface area within the pore structure is extremely large (>500 $m^2$/gram). When sufficient energy is added through heat, the surface tension of the polymer, as it approaches the crystalline melting point may cause rapid fiber contraction and pore closure. It may be critical to control the temperature so that this process just begins but does not reach full and complete melting of the polymer crystallinity. If that happens, the tubular nature of the fibers may disappear. Since the hollow fibers are preferably contained within the woven mat structure, some shrinkage may occur but it may be held in check by the warp threads. What is desired is a resultant hollow fiber having a tubular structure but with the pores in the walls in at least certain segments having reduced size, or being collapsed and effectively removed.

In accordance with at least certain embodiments, there is provided a method of selectively heat treating a stripe or band of the hollow fiber array while leaving the untreated array unaffected. This method may be most effective when used on dry stretch formed hollow fiber membranes. By applying specifically controlled temperature and mechanical load conditions the porosity within the heat treated zone may be reduced or eliminated completely. Also, within a width of array, one can create one or more heat treated zones of varying widths.

This technique may be very useful for contactors or modules that have multiple tube sheets. The tube sheets create different volumes within a single module. It may be beneficial to apply this special heat treatment within the volume created by one or more of these zones. For example, if one of the fluid streams entering one of these volumes is gaseous it will inadvertently enter the pore structure of the membrane. By heat treating this zone selectively one can make the membrane impermeable and direct the gaseous flow to the membrane it is intended for.

In one possibly preferred embodiment, the present heat treat method may be used is in a Contained Liquid Membrane (CLM) Module having two different gas streams flow from zones B1 to B2 and from zones C1 to C2. Selective heat treatment is applied in the volumes created between the tube sheets in the B1 and C2 zones. This prevents the two gas streams from mixing together before they enter the CLM portion of the module in the middle.

In at least one embodiment, the invention preferably relates to a hollow fiber membrane mat having hollow fiber membranes arranged parallel to one another and adjacent to one another, the membranes having a wall and a continuous lumen, wherein the hollow fiber membranes are connected to one another by means of a plurality of linear connecting elements which are arranged spaced apart from one another and parallel to one another and the membranes are kept apart from one another by the linear connecting elements and wherein the hollow fiber membranes are composed of a thermoplastic polymer and wherein the walls of the hollow fiber membranes arranged adjacent to one another are fluid-tight in at least one band, section or stripe extending parallel to the linear connecting elements, and inside of which stripe the hollow fiber membranes are fluid-tight. Other embodiments of the invention preferably relate to a method for producing and/or using such hollow fiber membrane mats.

In at least certain embodiments, the invention preferably relates to a hollow fiber membrane mat or arrangement (or contactor including one or more such mats) having hollow fiber membranes arranged overlapping and adjacent to one another, the membranes having a wall and a continuous lumen, wherein the hollow fiber membranes are composed of a thermoplastic polymer and wherein the walls of at least the hollow fiber membranes arranged adjacent to one another are fluid-tight in at least one stripe extending along the length of the mat (or contactor), and inside of which stripe the hollow fiber membranes are fluid-tight. Other embodiments of the invention preferably relate to a method for producing and/or using such hollow fiber membrane mats.

The above examples and embodiments are not limiting and the present invention may be embodied in other forms or modifications without departing from spirit and scope of the invention, and, accordingly reference may be made to the appended claims as indicating the scope of the invention.

The invention claimed is:

1. A method for producing a hollow fiber membrane mat with at least one stripe-shaped area in which the walls of the hollow fiber membranes are fluid impermeable, comprising the following steps: a) providing a hollow fiber membrane mat having hollow fiber membranes arranged parallel to one another and adjacent to one another, said membranes having at least one of a porous, microporous, and semi-permeable wall and a continuous lumen, wherein the hollow fiber membranes are connected to one another by means of a plurality of linear connecting elements which are arranged spaced apart from one another and parallel to one another and said membranes are kept at a distance by the linear connecting elements and wherein the hollow fiber membranes are composed of a thermoplastic polymer, and the linear connecting elements have a melting temperature that is at least as high as the melting temperature of the thermoplastic polymer composing the hollow fiber membranes, and the linear connecting elements have a superheated steam shrinkage of at most 5% at a temperature of 121° C. and an atmospheric humidity of 100%, b) transporting the hollow fiber membrane mat by means of a transport equipment and at a transport speed in the direction of the extension of the linear connecting elements and under a tension acting in the transport direction through at least one heating device extending in the transport direction having heating elements arranged above and below the hollow fiber membrane mat and at a distance from the surface of the hollow fiber membrane mat as well as from one another via which heat is supplied to the hollow fiber membranes in a treatment zone over a width B transverse to the transport direction, whereby the hollow fiber mat is treated in a treatment area, and simultaneously c) gripping of the hollow fiber membrane mat in zones, which are located to the right and left of the at least one heating device when viewed in the transport direction, by clamping devices, which are adjustable regarding their contact pressure perpendicular to the flat extension of the hollow fiber membrane mat, by means of which clamping devices the hollow fiber membranes are held under tension transverse to the transport direction, wherein in the treatment zone the temperature is adjusted to a temperature 5 to 15% below the melting temperature of the polymer composing the hollow fiber membranes by means of the heating elements so that a shrinkage of the hollow fiber membranes is initiated in the treatment area, and wherein by adjusting the contact pressure of the clamping devices, the hollow fiber membranes are held under tension in their longitudinal extension so that the hollow fiber membranes retain a straight-line course in their longitudinal extension.

2. The method according to claim 1, characterized in that the hollow fiber membrane mat is transported between a carrier belt arranged above and below the hollow fiber membrane mat and covering the hollow fiber membrane mat at least in the area of the at least one heating device through the at least one first heating device.

3. The method according to claim 2, characterized in that the hollow fiber membrane mat is covered in the area of its side edges by the carrier belts and together with the covering carrier belts is fed by skid-shaped clamping devices.

4. The method according to claim 1, characterized in that the length of the heating elements in the transport direction as well as the transport speed are adjusted so that the residence time of the hollow fiber membrane mat in the treatment zone lies in the range of 0.5 to 5 min.

5. The method according to claim 1, characterized in that the heating elements are radiant heating elements.

6. The method according to claim 5, characterized in that the radiant heating elements are flat hotplates.

7. The method according to claim 6, characterized in that the distance between the hotplates is 4 to 8 mm.

8. The method according to claim 1, characterized in that the hollow fiber membrane mat is fed through at least one second heating device which is arranged transverse to the transport direction at a distance from the first heating device, by means of which at least one further stripe-shaped area is created in the extension direction of the linear connecting elements, in which area the walls of the hollow fiber membranes are fluid impermeable.

9. The method according to claim 1, characterized in that the tension acting in the transport direction lies in the range of 5 to 15 cN per linear connecting element.

10. The method according to claim 1, characterized in that the polymer composing the hollow fiber membranes is a polyolefin.

11. The method according to claim 1, characterized in that the linear connecting elements are connecting threads, members or fibers.

12. The method according to claim 1, characterized in that the connecting elements are multifilament polyester yarns.

* * * * *